United States Patent
Peskin et al.

(10) Patent No.: US 8,178,143 B2
(45) Date of Patent: May 15, 2012

(54) FOOD PRODUCT SIMULATING PIECES OF NATURAL MEAT AND METHOD FOR PRODUCING SAME

(75) Inventors: Alexander Vladimirovich Peskin, Moscow (RU); Elena Vladimirovna Ogneva, Moskovskaya oblast (RU)

(73) Assignee: Obschestvo S Organichennoy Otvetstvennost Ju "MARS", Moskovskaya Oblast (RU)

( * ) Notice: Subject to any disclaimer, the term of this patent is extended or adjusted under 35 U.S.C. 154(b) by 107 days.

(21) Appl. No.: 12/593,433

(22) PCT Filed: Mar. 18, 2008

(86) PCT No.: PCT/RU2008/000150
§ 371 (c)(1), (2), (4) Date: Mar. 8, 2010

(87) PCT Pub. No.: WO2008/121018
PCT Pub. Date: Oct. 9, 2008

(65) Prior Publication Data
US 2010/0166935 A1    Jul. 1, 2010

(30) Foreign Application Priority Data
Mar. 29, 2007   (EA) .................................. 200700781

(51) Int. Cl.
*A22C 7/00*    (2006.01)
(52) U.S. Cl. ........ 426/305; 426/575; 426/646; 426/513; 426/517; 426/518; 426/802; 426/805
(58) Field of Classification Search .................. 426/302, 426/305, 307, 573–575, 646, 512–513, 517, 426/802, 805, 104, 518
See application file for complete search history.

(56) References Cited

U.S. PATENT DOCUMENTS

| | | | |
|---|---|---|---|
| 3,883,672 A | 5/1975 | Bone et al. | |
| 3,924,296 A * | 12/1975 | Wilkerson | 426/513 |
| 4,162,332 A * | 7/1979 | Sienkiewicz et al. | 426/249 |
| 4,521,435 A * | 6/1985 | Peters | 426/92 |
| 4,781,939 A | 11/1988 | Martin et al. | |
| 4,824,687 A * | 4/1989 | Yasuno | 426/643 |
| 5,827,561 A * | 10/1998 | Duve | 426/513 |

(Continued)

FOREIGN PATENT DOCUMENTS

| | | |
|---|---|---|
| GB | 1474629 A | 5/1977 |
| RU | 2222964 | 2/2004 |
| RU | 2247517 | 3/2005 |

(Continued)

OTHER PUBLICATIONS

International Search Report and Written Opinion mailed on Mar. 27, 2009, PCT/RU2008/000150.

*Primary Examiner* — Drew E Becker
(74) *Attorney, Agent, or Firm* — Warner Norcross & Judd LLP

(57) ABSTRACT

The invention generally relates to the meat industry, specifically it relates to meat products which are firstly intended for pets, in particular for cats and dogs, or other domestic animals whose feeding diet includes natural meat and, more specifically the invention relates to a food product simulating natural meat chunks or pieces and a method for producing same. The disclosure of the invention provides for a food product having pieces simulating a piece of natural meat, wherein one of the surfaces of each piece has a distinctly defined structure similar to the striated muscle fiber structure of natural meat. The disclosure of the invention provides also a method for producing such food product.

9 Claims, 4 Drawing Sheets

U.S. PATENT DOCUMENTS

| | | | |
|---|---|---|---|
| 5,928,705 A * | 7/1999 | Matthews et al. | 426/646 |
| 6,379,738 B1 | 4/2002 | Dingman | |
| 2002/0106442 A1 * | 8/2002 | Dingman et al. | 426/646 |
| 2005/0031673 A1 | 2/2005 | Saylock et al. | |
| 2009/0274800 A1 * | 11/2009 | Assenmacher et al. | 426/129 |
| 2010/0074998 A1 * | 3/2010 | Espeleta Vega et al. | 426/92 |

FOREIGN PATENT DOCUMENTS

| | | |
|---|---|---|
| WO | 0053031 | 9/2000 |
| WO | 0135766 | 5/2001 |
| WO | 03024240 | 3/2003 |
| WO | 2004023887 A | 3/2004 |

* cited by examiner

FOOD PRODUCT SIMULATING PIECES OF NATURAL MEAT AND METHOD FOR PRODUCING SAME

BACKGROUND OF THE INVENTION

The present invention generally relates to the meat industry, specifically the invention relates to meat products which are primarily intended for pets, in particular for cats and dogs, or other domestic animals, whose feeding diet includes natural meat. More particularly, the invention relates to a food product simulating the natural meat chunks or pieces and a method for producing same.

The closest prior art over the present invention may serve a cat food that simulates natural meat chunks, produced by Nestle Purina PetCare Deutschland (Germany), which is commercially available today in a number of the countries of Western Europe. The photographs of the samples of the food product according to the present invention and the closest prior art food are attached herein.

The closest prior art pet food is characterized by the presence of discrete pieces the exterior surfaces of these pieces not have a distinctly defined surface structure resembling the structure of natural meat.

The practice of marketing the food products of this type has shown that the foods having indistinctly distinguishable surface structure or texture are perceived by a potential consumer, the pet owner, as a vegetable meat analog produced by using meat-free materials with the addition of natural flavors and other auxiliary additives, thereby making the product unacceptable by its organoleptic properties for consumers. This eventually would affect unfavorably the level of consumer demand.

The method for producing a food product which is described herein has not been found in the state of the art.

SUMMARY OF THE INVENTION

The problem to be solved by the present invention is to provide for a food product simulating pieces of natural meat, which would have organoleptic characteristics maximally approaching the organoleptic characteristics of natural meat.

This problem is solved by providing according to the invention a food product simulating pieces of natural meat, wherein one of the exterior surfaces of each piece has a distinctly defined structure similar to the striated muscle fibre structure of natural meat.

In other words, a distinctly defined structure similar to the structure the striated muscle fibre of natural meat is imparted to the end food product, specifically to its individual pieces.

Another problem to be solved by the present invention is to provide a method for producing a food product simulating pieces of natural meat, wherein one of the exterior surfaces of each piece has a distinctly defined structure similar to the striated muscle fibre structure of natural meat.

This problem is solved by providing a method for producing a food product, characterized in that said method is carried out according to the present invention by:
 grinding a meat and/or meat byproducts so as to produce a meat emulsion;
 forming the meat emulsion to produce a layer of the meat emulsion;
 coating the layer of the meat emulsion with a gel composed of water and an edible hydrocolloid to produce the gel-coated layer of the meat emulsion;
 scraping off the gel and the layer of the meat emulsion adjacent to the gel to produce the semifinished meat product having a distinctly defined structure similar to the striated muscle fiber structure of natural meat; and
 subjecting the semifinished meat to a heat treatment with subsequent cutting the resulting product into individual pieces to produce the end food product simulating pieces of natural meat, wherein one of the exterior surfaces of each piece has a distinctly defined structure similar to the striated muscle fibre structure of natural meat.

As a consequence, the thus-produced food product having pieces simulating a piece of natural meat has the organoleptic characteristics maximally approaching the organoleptic characteristics of natural meat.

It is preferable to add, during the grinding of a meat and/or meat foods which produce the meat emulsion, at least one of food additives selected from the group consisting of vitamins, minerals, a common salt and an iodinated salt to the meat and/or meat byproducts.

The inclusion of other nutritional ingredients selected from the group consisting of cereals, fats, oils, fish parts, the processing by-products of shrimps to meat and/or meat byproducts is also preferable during the grinding process making the meat emulsion.

This provides the preparation of the end food product which includes macro- and micronutrients which are necessary for providing a health feeding of pet animals, the diet of which includes natural meat.

It has been found experimentally that it is preferred during the process of forming the layer of the meat emulsion to set its thickness in the range of from about 0.1 mm to about 5.0 mm.

It has been found that it is impossible to form the layer of the meat emulsion if the thickness of the layer is less than 0.1 mm, and if the thickness of the layer of the meat emulsion is more than 5.0 mm, the quality of the end food product decreases because of lacking the texture and the structure of the striated muscle fibres of natural meat.

It is preferred to use also as an edible hydrocolloid the ethers of cellulose such as hydroxypropylene cellulose, hydroxypropylenemethyl cellulose, methyl cellulose, ethyl cellulose, sodium carboxymethyl cellulose. Our experience showed that an edible hydrocolloid according to the invention may be other substances such as agar, sodium alginate, gelatin, starches, pectin, carrageenan and salts thereof, gums.

For providing the fixation of the structure of the food product according to the invention it is necessary to carry out, for example, a heat treatment which in one embodiment include the treatment, wherein the semifinished meat product is subjected to infrared radiation with subsequent retaining the thus-treated product under the conditions of saturated vapor. Owing to using such heat treatment, the desired fixation of the food product structure is achieved.

In another equally effective embodiment, the heat treatment of the semifinished food product can be carried out by placing it in the hot air stream.

In other embodiments of the present invention, the fixation of the structure of the semifinished meat product can be carried by the methods which are well known to the skilled persons in the art, for example, by means of a microwave treatment, ohmic heating or freezing.

BRIEF DESCRIPTION OF THE DRAWINGS

The invention is described in more detail, by a way of example, in the accompanying photographs and the drawings which illustrate the food product simulating natural meat chunks and a method for producing it, in which

FIG. 3 and FIG. 4 show distinctly the appearance, texture and structure of the food product according to the invention which simulates the pieces of natural meat, wherein the surface of each individual piece has a distinctly defined structure resembling the structure of the striated muscle fibres of natural meat.

DETAILED DESCRIPTION OF THE INVENTION

Figure 1:
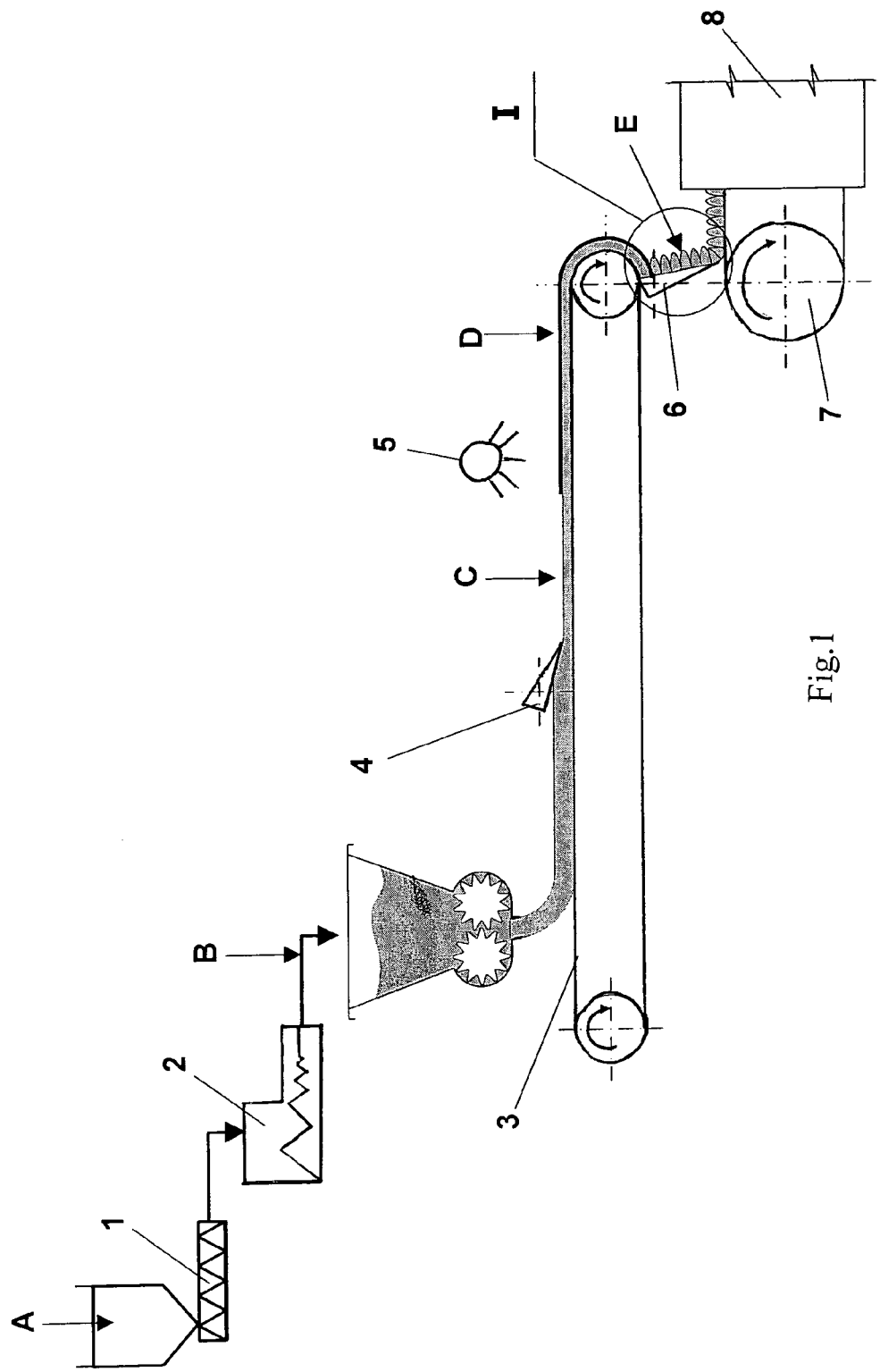
FIG. 1 is a schematic view of the processing line for producing the food product simulating the natural meat pieces according to the present invention.

According to the invention, the food product is manufactured on the processing line (shown in FIG. 1), comprising consecutively arranged:
the grinder 1 for providing coarse comminution of the meat and/or meat byproducts A;
the emulsifier 2 for producing from the meat and/or meat food A the meat emulsion B;
mounted beneath the meat emulsifier 2 the first belt conveyer 3 whereon the layer C of the meat emulsion is formed;
mounted above the first belt conveyer 3 the means 4 for controlling the thickness of the layer of the meat emulsion;
mounted above the first belt conveyer 3 the means 5 for applying a coating of a gel composed of water and an edible hydrocolloid to provide the gel-coated layer D of the meat emulsion;
means 6 for scraping off the gel and the layer D of the meat emulsion adjacent to the gel from the surface of first belt conveyer 3 to produce the semifinished meat product E having a distinctly defined surface texture and structure similar to the striated muscle fibre structure of natural meat;
mounted beneath the means 6 for scraping off the gel and the layer D of the meat emulsion adjacent to the gel the second belt conveyer 7 for conveying the scraped off semifinished meat into the defined zone of the means 8 embracing the second belt conveyer 7 for fixing the structure of the semifinished meat product; and
the means (not shown) for cutting the semifinished meat product into individual pieces after the heat treatment process.

The means 4 for controlling the thickness of the layer of the meat emulsion is a metallic gate which is mounted above the first belt conveyer 3 with a variable gap clearance in the combination with a forming press.

The means 5 for applying a coating of the gel comprising water and an edible hydrocolloid is a sprayer.

The means 8 for fixing or tight setting the structure of the semifinished meat is a chamber which is designed to supply a hot air stream (not shown).

Figure 2:
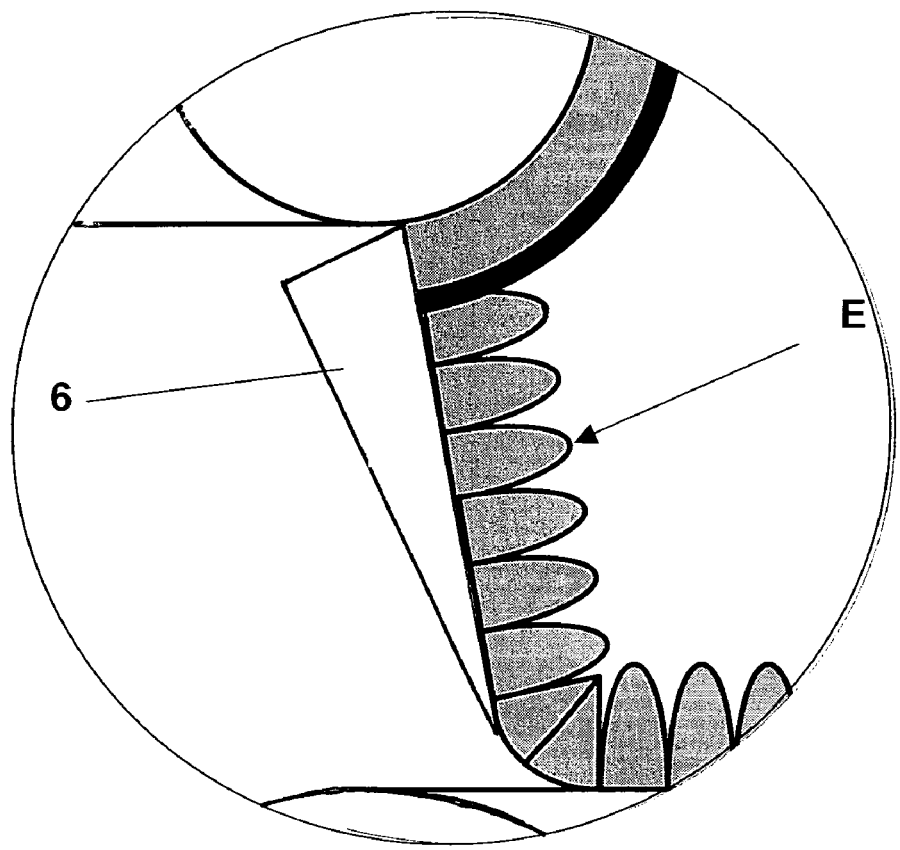
FIG. 2 is an enlarged view of the structure to be formed which is closely resembles the striated muscle fibre structure of natural meat.
Figure 3:
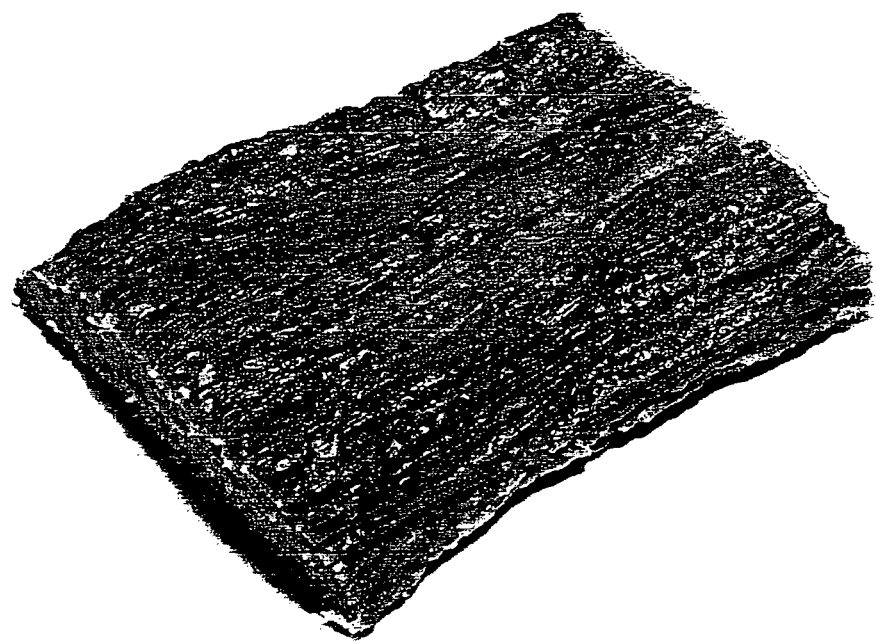
FIG. 3 is a photograph of a perspective view of the food product produced according to the method of the present invention.
Figure 4:
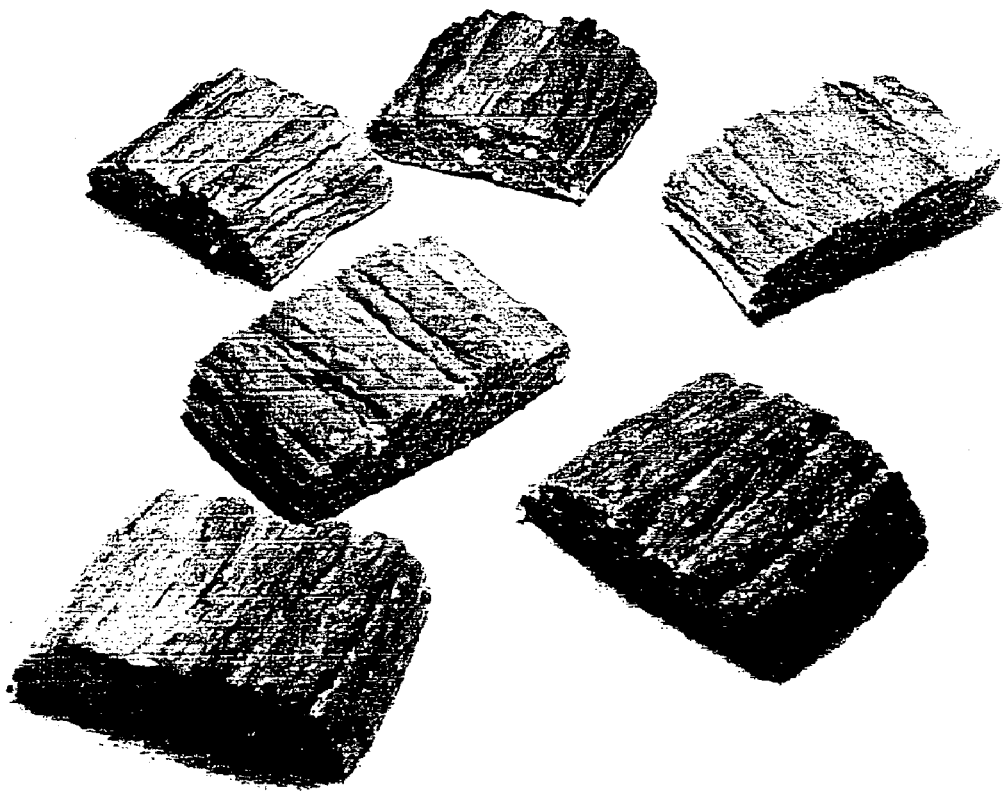
FIG. 4 is a photograph of an enlarged perspective view of a single piece of the food product produced according to the method of the present invention.

The food product of the invention is made according to the following procedure. Meat and/or meat byproducts A are ground by the meat grinder and the following emulsifier 2 so as to produce the meat emulsion B. Thereafter, the meat emulsion B is formed by using the means 4 for controlling the thickness of the layer of the meat emulsion to produce the layer C of the meat emulsion. This is carried out in two steps. In the first step the meat emulsion is pressed out by means of a forming press onto the surface of first belt conveyer 3. In the second step the meat emulsion layer thus formed is thinned by means of a metallic gate mounted above the first belt conveyer so as to provide a gap clearance which may be varied. Thereafter, the layer C of the meat emulsion is coated with a gel composition comprising water and an edible hydrocolloid by using the sprayer 5, thereby providing the gel-coated layer D of the meat emulsion. Then, the gel coating and the layer D of the meat emulsion, being adjacent to gel, is scraped off by means of the scraper 6, thereby providing the semifinished meat product E, which has a distinctly defined texture similar to the striated muscle fibres structure of natural meat. This process is explicitly illustrated in FIG. 2. The structure of the semifinished meat product E is then fixed and cut into individual pieces, thereby providing the end food product simulating the natural meat pieces whose surfaces have a distinctly defined structure similar to that of the striated muscle fibres of natural meat. The fixation of the structure of the semifinished meat product E is carried out in a hot air stream-supplied chamber. The step of cutting the semifinished meat product E into individual pieces is carried out by means of the series of the consecutively mounted disk cutters and guillotine-type knives.

Thus, the above-described production process provides the preparation from a meat and/or the meat foods the food product simulating the natural meat pieces the exterior surfaces of which have a distinctly defined structure similar to the striated muscle fibre structure of natural meat.

What is claimed is:

1. A method for producing a food product simulating natural meat pieces, wherein said method is carried out by:
grinding a meat and/or meat byproducts to produce a meat emulsion;
forming the meat emulsion to produce a layer of the meat emulsion;
coating the layer of the meat emulsion with a gel comprising water and an edible hydrocolloid to produce the gel-coated layer of the meat emulsion;
scraping off the gel and the layer of the meat emulsion adjacent to the gel to produce the semifinished meat product having a distinctly defined structure similar to the striated muscle fiber structure of natural meat; and
fixing the structure of the semifinished meat product and cutting the resulting product into individual pieces to produce the food product simulating natural meat pieces.

2. The method according to claim 1, characterized in that the grinding of a meat and/or meat byproducts, which produce the meat emulsion, is followed by the addition of at least one food additive selected from the group consisting of vitamins, minerals, a common salt and an iodinated salt to the meat and/or meat foods.

3. The method according to claim 1, characterized in that the grinding of a meat and/or meat byproducts, which produce the meat emulsion, is followed by the addition of other nutritional components selected from the group consisting of cereals, fats, oils, fish parts, the shrimp processing by-products to the meat and/or meat byproducts.

4. The method according to claim 1, characterized in that a thickness of the layer of the meat emulsion is in the range of from about 0.1 mm to about 5.0 mm.

5. The method according to claim 1, characterized in that an edible hydrocolloid is an cellulose ether.

6. The method according to claim 1, characterized in that the fixing of the structure of the semifinished meat product is carried out by means of a heat treatment.

7. The method according to claim 6, characterized in that the heat treatment of the semifinished meat product is carried out by subjecting the product to IR-radiation with subsequent holding the semifinished meat product under conditions of a saturated steam.

8. The method according to claim 6, characterized in that the heat treatment of the semifinished meat product is carried out by placing the product into a hot air stream.

9. The method according to claim 5, characterized in that the cellulose ether is hydroxypropylene cellulose, hydroxypropylenemethyl cellulose, methyl cellulose, ethyl cellulose, or sodium carboxymethyl cellulose.

* * * * *